United States Patent [19]
Hofmann

[11] 4,162,634
[45] Jul. 31, 1979

[54] METHOD OF AND APPARATUS FOR BALANCING ROTORS

[75] Inventor: Dionys Hofmann, Darmstadt, Fed. Rep. of Germany

[73] Assignee: Gebr. Hofmann G.m.b.H. & Co. KG, Maschinenfabrik, Darmstadt, Fed. Rep. of Germany

[21] Appl. No.: 935,844

[22] Filed: Aug. 22, 1978

[30] Foreign Application Priority Data
Sep. 8, 1977 [DE] Fed. Rep. of Germany ....... 2740454

[51] Int. Cl.$^2$ ............................................. G01M 1/22
[52] U.S. Cl. ...................................... 73/462; 364/508
[58] Field of Search ................................. 73/462–465; 364/508, 550

[56] References Cited

U.S. PATENT DOCUMENTS

| | | |
|---|---|---|
| 3,741,016 | 6/1973 | Hofmann ............................ 73/462 |
| 4,064,704 | 12/1977 | Blackburn .......................... 73/462 |
| 4,109,312 | 8/1978 | Beutel ................................ 364/508 |

Primary Examiner—James J. Gill
Attorney, Agent, or Firm—Cushman, Darby & Cushman

[57] ABSTRACT

A method and apparatus for balancing a rotor in at least one plane. The geometrical parameters of the rotor are stored along with test values representing the rotor in balance as determined during a test run. These stored values are transmitted to a frame computer which determines the size and phase relationship of counterweights necessary to balance the rotor. The test values resulting from the test run are stored for the entire duration of the balancing operation upstream of the frame computer. Also, the geometrical parameters of the rotor may be recalled and displayed at any time during the operation.

10 Claims, 1 Drawing Figure

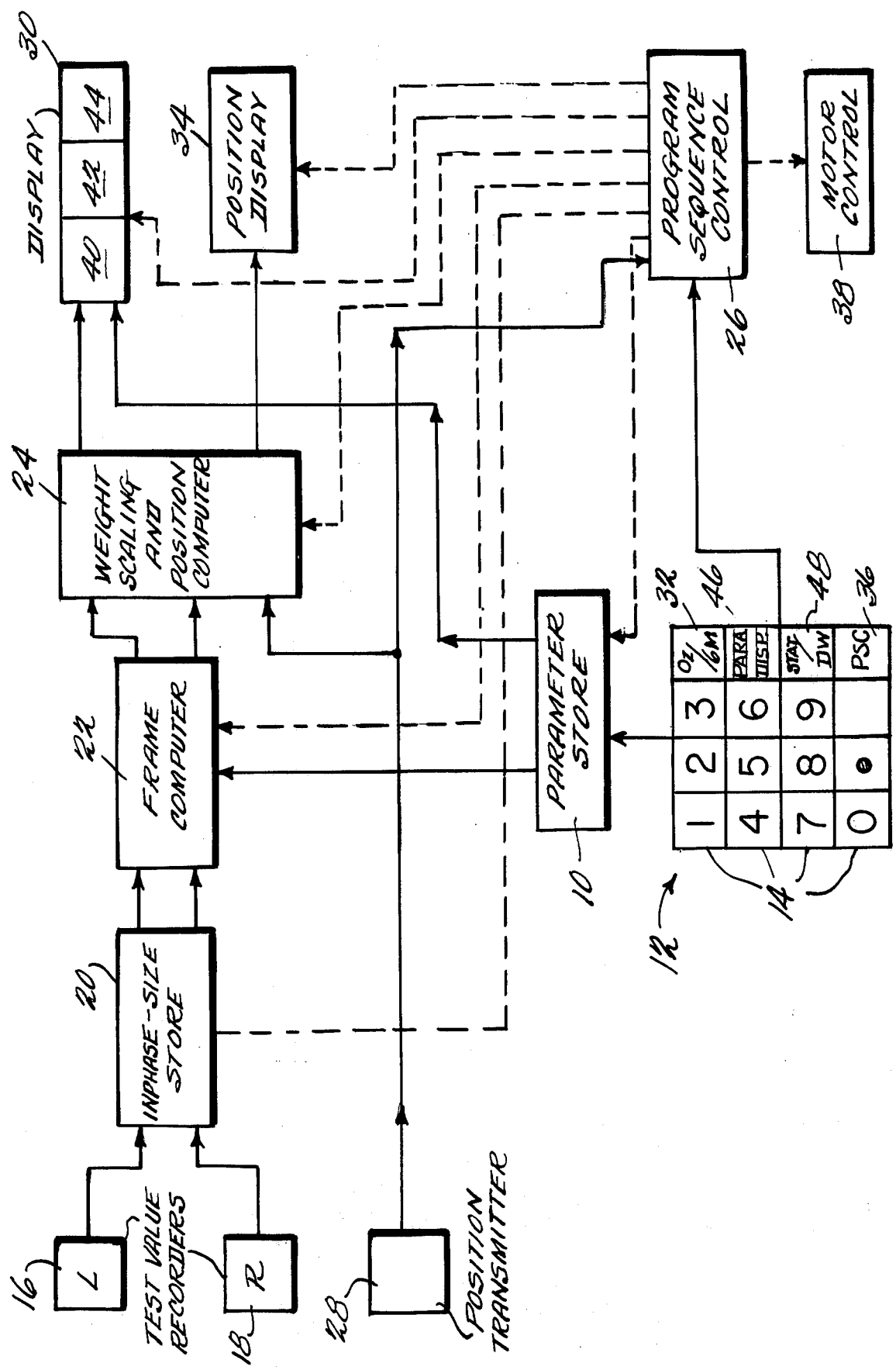

METHOD OF AND APPARATUS FOR BALANCING ROTORS

This invention relates to methods of and apparatus for balancing rotary bodies (hereinafter referred to as "rotors"), for example motor vehicle wheels.

In a known balancing machine, for balancing in one or more planes, values for geometrical dimensions of the rotor are fed into an electronic measuring means. Imbalances determined by means of test value recorders are fed directly into a frame computer of the electronic measuring means, which determines the size and phase relationship of the balance weights or counterweights with the aid of the geometrical parameters previously fed into the electronic measuring means. The frame computer, also known in the art as a plane separation network or computer, converts or transforms an imbalance from a measurement plane or planes to a compensation or correction plane or planes, and may also, if there are a plurality of correction planes, eliminate mutual influencing of the correction planes.

With the known machine, a renewed test run is necessary in order to correct the geometrical parameters of the rotor, in order to obtain the new altered counterweight sizes and phase relationships. Furthermore, control of the entered values is no longer unequivocally possible after the test run.

According to a first aspect of the invention, there is provided a method of balancing an imbalanced rotor, wherein, for balancing in one or more planes, values of geometrical parameters of the rotor are fed into a geometrical parameter store, test values representative of imbalances determined by test value recorders during a test run are stored in order of size and in phase and are transmitted to a frame computer by means of a program sequence control means, and the values of the geometrical parameters of the rotor to be balanced are fed from the geometrical parameters into the frame computer which determines with the aid of said stored values the size and phase relationship of counterweights to balance the rotor.

The values determined by the test value recorders can remain stored upstream of the frame computer for the complete duration of a balancing test run.

In a preferred embodiment the geometrical parameters of the rotors to be balanced can be recalled from the geometrical parameter store and displayed. In addition, the size and phase relationships of the counterweights can be determined by means of the program sequence control means. It is also possible to switch over the frame computer and to calculate the static imbalance and to display it. The display of the counterweight size can be effected in ounces or grams, in the preferred embodiment, by switching over an operating key.

According to a second aspect of the invention there is provided apparatus for balancing an imbalanced rotor, the apparatus comprising a geometrical parameter store for storing values of geometrical parameters of the rotor, test value recorders to provide test values representative of imbalances during a test run, an inphase size-store to store said test values in order of size and phase, a frame computer to determine with the aid of said stored values the size and phase relations of counterweights to balance the rotor, and a program sequence control means to initiate said determination by the frame computer.

The individual processes can be initiated by operating corresponding operating keys.

By means of methods and apparatus embodying the invention, the operator can at any time check the recorded values before or after the test run.

In respect of a plurality of similar rotors or a complete series requiring balancing, the correct balancing planes or the geometrical parameters can be established by means of apparatus embodying the invention, in particular with respect to rotors which are difficult to measure, as for example air wheels. For this purpose, a completely balanced rotor is mounted on a balancing machine and a known size of weight is introduced into the plane. The geometrical parameters of the rotor can subsequently be fed into an electronic measuring means and they continue to be corrected until the size of weight introduced is displayed in the one plane on the display means and zero is displayed in the other plane on the display means. In each case, here, only a simple switchover operation is necessary without a test run having to be carried out after each new entry or calculation. This setting of the geometrical parameters can also be carried out automatically by means of a corresponding switching.

The invention will now be further described, by way of example, with reference to the accompaying drawing, the sole FIGURE of which is a block wiring diagram of an embodiment of the invention.

The sole FIGURE of the accompanying drawing is a block wiring diagram of an electronic measuring means suitable for carrying out the invention. Geometrical parameters of a rotor to be balanced can be fed into a geometrical parameter store 10 by way of an input keyboard 12 provided with corresponding keys 14. The geometrical parameters normally comprise the diameter and the width of the rotor to be balanced and the distance from a fixed point on a balancing machine (not shown) to an inner balance plane of the rotor to be balanced. The feeding in of the geometrical parameters can be carried out, for example, as disclosed in our German Patent Application No. P 27 37 524.2.

Imbalance test values from test value recorders 16 and 18 of left and right working planes of the balancing machine can be transmitted to an inphase size-store 20. The inphase size-store 20 and the geometrical parameter store means 10 are each connected to a frame computer 22. Values for the size and phase relationships of counterweights to correct imbalance are determined by a frame computer 22 and are transmitted to a weight scaling and position computer 24.

Current angular positions are fed into the weight scaling and position computer 24 and to a program sequence control means 26 by a position transmitter 28. By means of the computer 24 the determined counterweight sizes can be converted into corresponding units, whereby in particular a display thereof can be effected in grams or ounces in a size display means 30. Operation of a key 32 of the input keyboard 12 enables the operation of the computer 24 (and thus the information provided by the display 30) to be switched between ounces and grams. The computer 24 also determines the position of the counterweights to be inserted and transmits this to a position display means 34, whereby in particular an angle display or an insertion direction display can be employed.

The program sequence control means 26 can be activated by operating a key 36 of the input key bank 12. This causes the geometrical parameters from the geometrical parameter store 10 and the determined values from the inphase size-store 20 to be fed into the frame computer 22. With the aid of these values the frame computer 22 then calculates the size and phase relationship of the counterweights to be inserted. Instead of using two individual operating keys, a single operating key with double significance can be adopted so that the corresponding operation is set into motion by a simple switching operation. The program sequence control means 26 also takes over monitoring of a motor control means 38 for controlling a motor of the balancing machine.

At the end of each test run the program sequence control means 26 is automatically actuated and initiates a determining of the size and phase relationship of the counterweights with the aid of the values which have just been fed into the stores 20 and 10.

The counterweight size display means 30 preferably comprises three individual instruments 40, 42 and 44. Dynamic imbalance is preferably represented on the two outer instruments 40 and 44 and static imbalance on the middle instrument 42.

The instruments 40 to 44 provide a display of the geometrical parameters of the rotor to be balanced by means of actuating a corresponding operating key 46 of the input means 12.

The computation and display of static and/or dynamic imbalance can be selected by means of an operating key 48 of the input keyboard 12.

If it is considered necessary, conversion to new geometrical parameters for a rotor to be balanced is possible without a renewed test run by means of storing the determined test values during the entire duration of the balancing. Furthermore, at any time during the entire duration of balancing a check can be carried out of the geometrical parameters which have been fed in and moreover the correct geometrical parameters can be found.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. A method of balancing an imbalanced rotor in at least one plane, said method comprising the steps of:
    storing the geometrical parameter value of said rotor;
    measuring, during a test run, test values representative of imbalances;
    storing said test values;
    transmitting, in accordance with a program sequence control means, said geometrical parameter value and said test values to a frame computer; and
    determining the size and phase relationship of counterweights to balance the rotor, utilizing said stored parameter and test values.

2. A method according to claim 1, wherein the test values resulting from said measuring step are stored for the entire duration of balancing upstream of said frame computer.

3. A method according to claim 1 or claim 2, further comprising the step of recalling and displaying the geometrical parameters of the rotor to be balanced.

4. A method according to claim 1 or claim 2, wherein said step of determining the size and phase relationship of the counterweights is controlled by means of said program sequence control means.

5. A method according to either claim 1 or 2, further comprising the step of calculating from said test values and displaying the static imbalance of the rotor.

6. A method according to either claim 1 or 2, further comprising the step of converting the units of size of the counterweights between ounces and grams.

7. Apparatus for balancing an imbalanced rotor, the apparatus comprising:
    geometrical parameter storage means for storing values of geometrical parameters of the rotor;
    test value recording means for providing test valves representative of imbalances during a test run; inphase size-storage means for storing said test values in order to size and phase; frame computer means for determining with the aid of said stored parameter and test values, the size and phase relations of counterweights to balance the rotor; and
    program sequence control means for initiating said determination by said frame computing means.

8. Apparatus according to claim 7, further comprising:
    weight scaling computer means for converting the determined counterweight sizes to weight units;
    means for displaying the sizes in the weight units; and
    an operating key enabling the computation function of the weight scaling computer to be switched between ounce and gram weight units.

9. Apparatus according to claim 7, further comprising:
    an operating key, said frame computer means being switched over by said key to calculate either static imbalance or dynamic imbalance; and
    display means for displaying either said imbalance.

10. Apparatus according to claim 7, further comprising:
    an operating key by, said geometrical parameters of the rotor being recalled by said key from the geometrical parameter store; and
    display means for displaying said geometrical parameters.

* * * * *